Oct. 10, 1961 R. H. OTTOSON 3,003,473
MECHANICAL LOCK FOR PISTONS OF FLUID PRESSURE RAMS
Filed Nov. 5, 1959 4 Sheets-Sheet 1
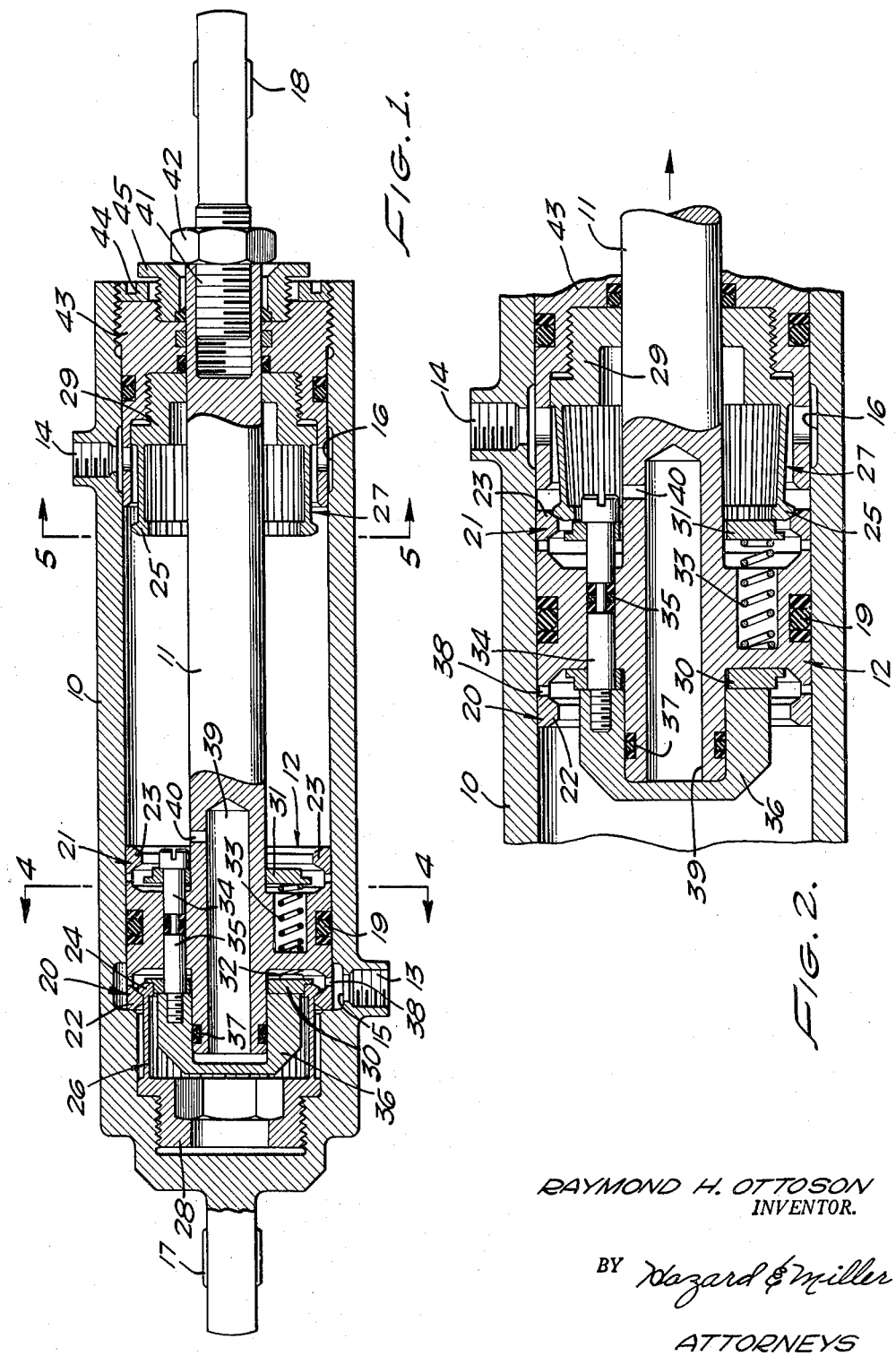
RAYMOND H. OTTOSON
INVENTOR.
BY Hazard & Miller
ATTORNEYS Oct. 10, 1961  R. H. OTTOSON  3,003,473
MECHANICAL LOCK FOR PISTONS OF FLUID PRESSURE RAMS
Filed Nov. 5, 1959  4 Sheets-Sheet 2

RAYMOND H. OTTOSON
INVENTOR.

BY Hazard & Miller
ATTORNEYS

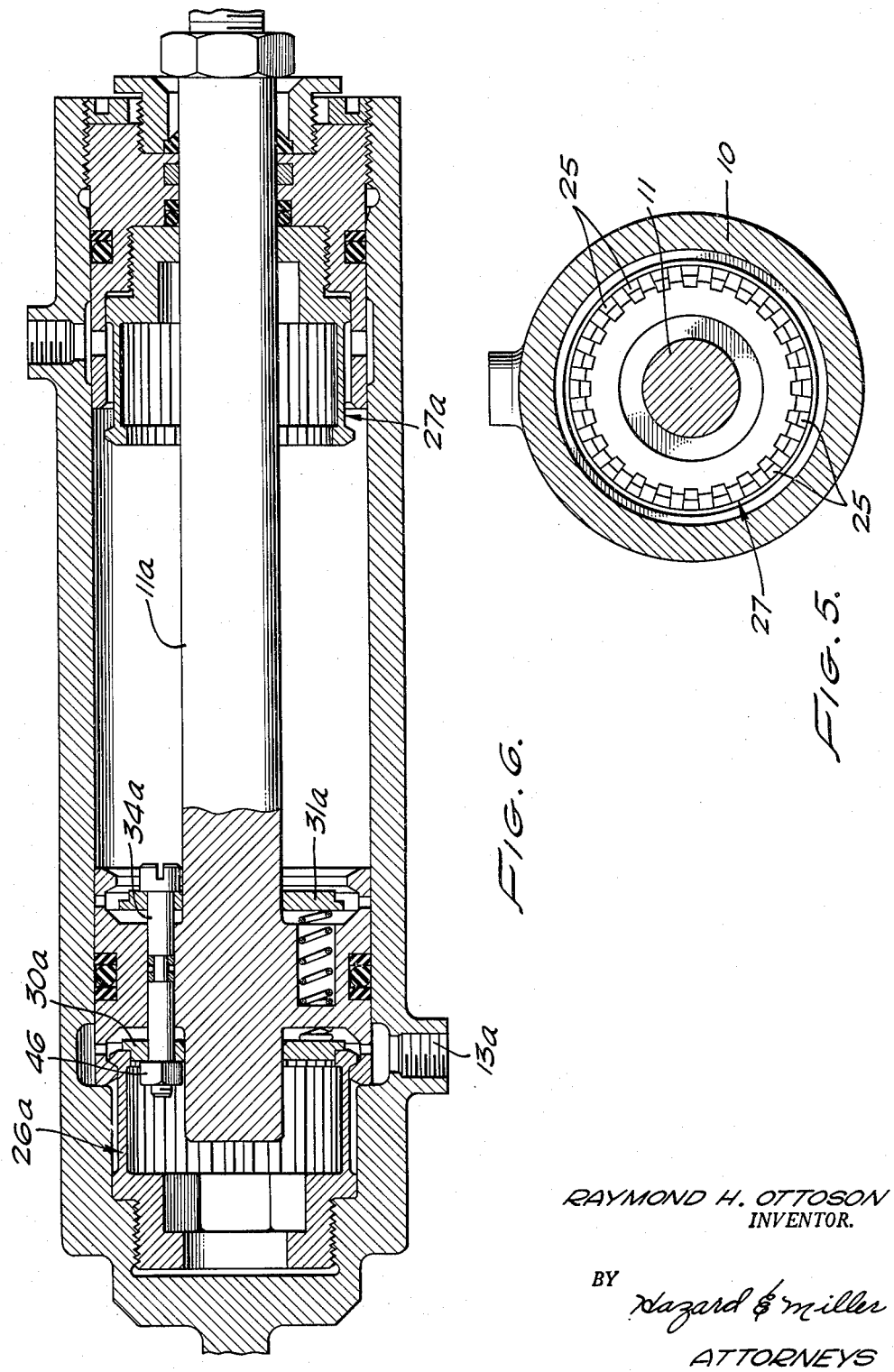

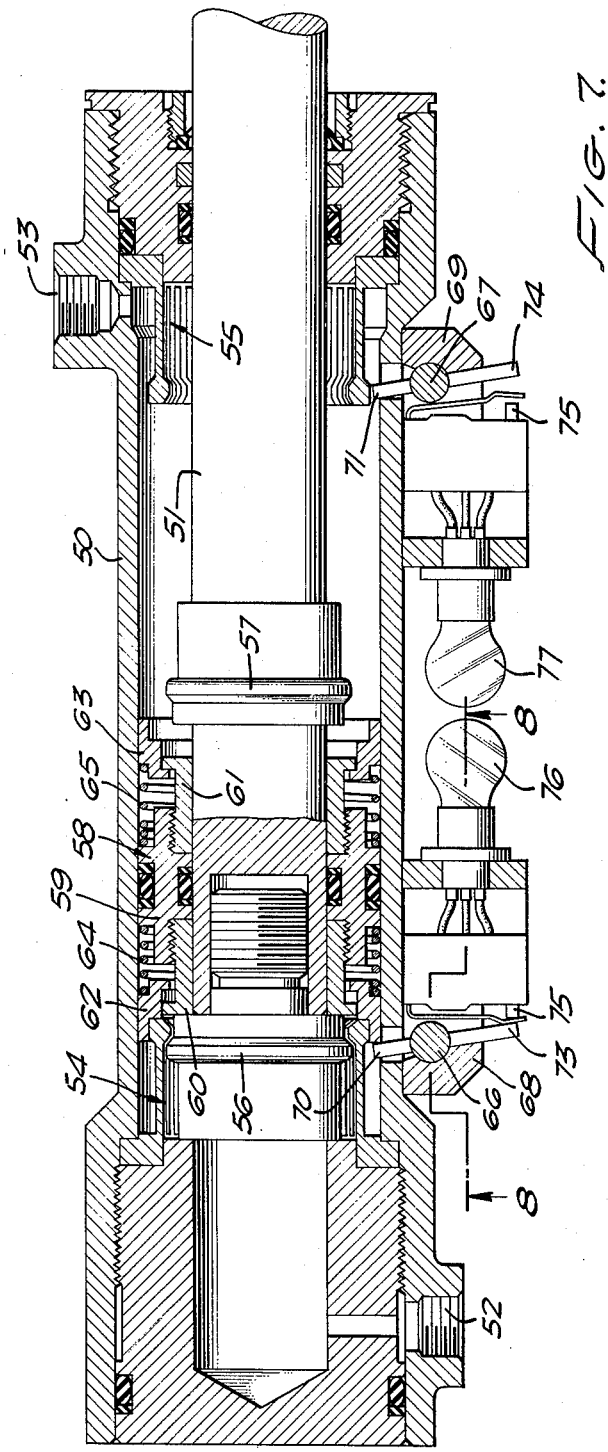
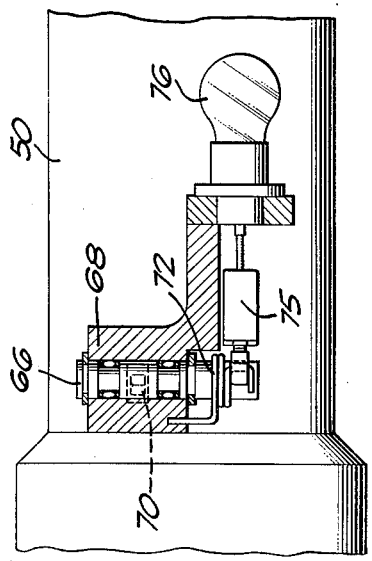
RAYMOND H. OTTOSON
INVENTOR.
BY Hazard & Miller
ATTORNEYS

United States Patent Office 3,003,473
Patented Oct. 10, 1961

3,003,473
MECHANICAL LOCK FOR PISTONS OF FLUID
PRESSURE RAMS
Raymond H. Ottoson, Garden Grove, Calif., assignor, by mesne assignments, to Clemco Aero Products, Inc., a corporation of Delaware
Filed Nov. 5, 1959, Ser. No. 851,078
9 Claims. (Cl. 121—40)

This invention relates to improvements in fluid pressure rams.

Explanatory of the present invention, many devices are actuated by pistons that are reciprocable in cylinders in response to fluid pressure admitted to an end of the cylinder so as to become effective on the piston therein. Frequently, the fluid pressure supplied to the end of a cylinder is a liquid pressure which, when the piston has been moved to the extreme end of its stroke in the cylinder may function as a hydraulic lock to retain the piston in the mentioned end of the cylinder until such time as conditions are reversed to return the piston to the other end of the cylinder. In many situations, this hydraulic lock is adequate to rigidly hold the piston in either of its extreme positions. However, there are situations where it is desirable to mechanically lock the piston in either of its extreme positions. The source of fluid pressure supplied to the cylinder may fail, thus releasing the hydraulic lock or expansion of the conduit leading to the cylinder under the influence of the pressure therein may have a tendency to release the piston to some extent so that the piston is not firmly held in either of its extreme positions. If the piston is pneumatically operated, such as by compressed air or a compressed gas, the very compressibility of the actuating medium itself is such as to prevent the piston from being rigidly held in either of its extreme positions if subjected to heavy forces tending to displace it therefrom.

A primary object of the present invention is to provide a mechanism which will automatically and mechanically lock the piston in either of its extreme positions within the cylinder on reaching such extreme positions so that the piston will be rigidly held in such extreme position despite the imposition of heavy external forces tending to displace it therefrom. The mechanical lock however is easily and automatically released to allow the piston to move from one end of the cylinder to the other in response to fluid pressure whenever the fluid pressure is admitted to the cylinder for that purpose.

Another object of the invention is to provide a fluid pressure operated ram having the above mentioned characteristics which is so designed that the effective length of the stroke of the piston in the cylinder can be easily varied and the mechanical lock above referred to, secured in any of the positions of adjusted length of stroke.

Still another object of the invention is to provide a fluid pressure operated ram having the above-described characteristics which is so designed that rotation of the piston relatively to the cylinder does not affect the operation of the mechanical lock.

With the foregoing and other objects in view, which will be made manifest in the following detailed description and specifically pointed out in the appended claims, reference is had to the accompanying drawings for an illustrative embodiment of the invention, wherein:

FIGURE 1 is a vertical section through a fluid pressure operated ram embodying the present invention, illustrating the piston of the ram as having been mechanically locked in one of its extreme positions;

FIG. 2 is a partial view in vertical section of the structure shown in FIG. 1, but illustrating the piston as approaching the extreme end of its stroke toward the opposite end of the cylinder;

FIG. 5 is a vertical section taken substantially upon the line 5—5 upon FIG. 1 in the direction indicated;

FIG. 6 is a vertical section similar to FIG. 1, but illustrating an alternative form of construction;

FIG. 7 is a sectional view through another form of construction embodying the present invention; and FIG. 8 is a sectional view taken substantially upon the line 8—8 upon FIG. 7 in the direction indicated.

Figure 3:
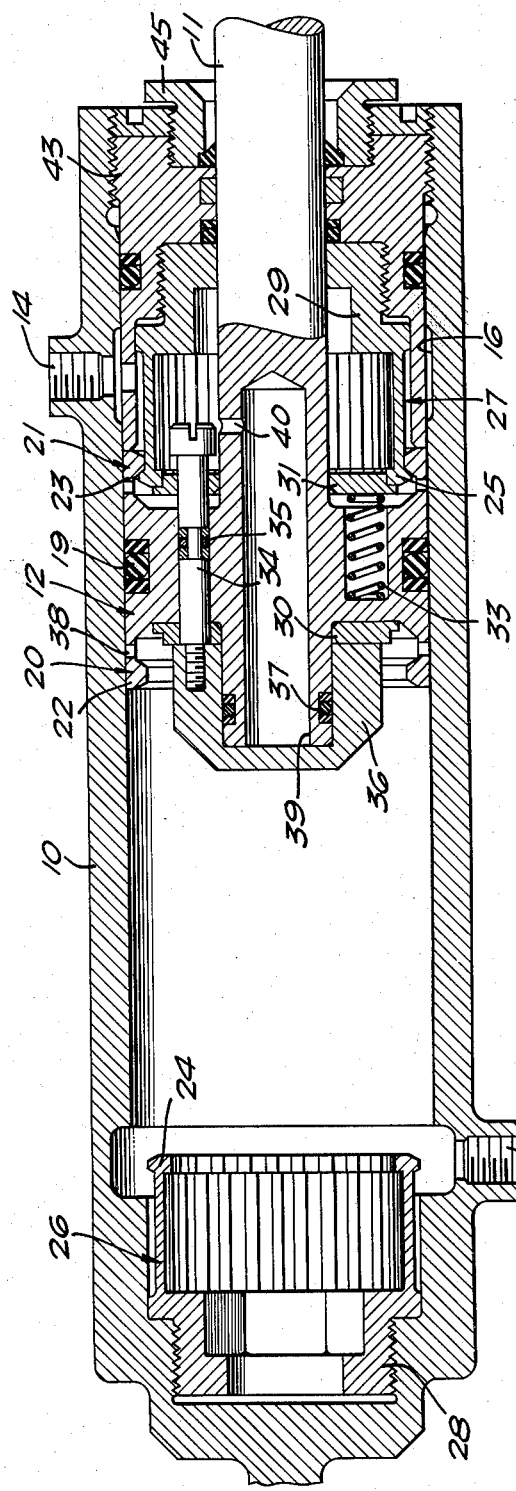
FIG. 3 is a view similar to FIG. 1, but illustrating the piston as having reached the extreme opposite end of its stroke and as having been locked therein.
Figure 4:
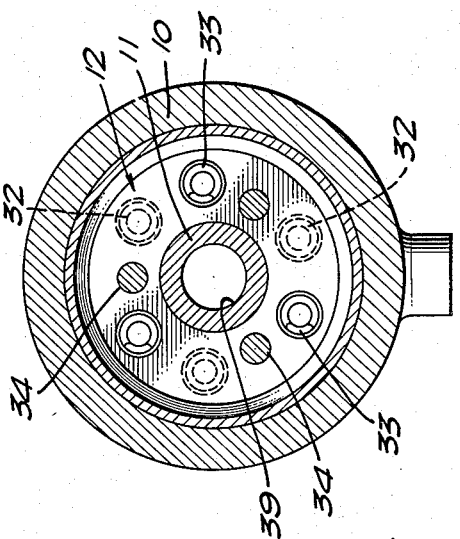
FIG. 4 is a vertical section taken substantially upon the line 4—4 upon FIG. 1 in the direction indicated.

Referring to the accompanying drawings wherein similar reference characters designate similar parts throughout, 10 indicates the cylinder of a fluid pressure operated ram within which there is reciprocable a piston rod 11 carrying a piston generally indicated at 12.

Near the ends of the cylinder 10 there are ports 13 and 14. The port 13 is designed to admit fluid pressure to the left-hand end of cylinder 10 as depicted in FIG. 1, for the purpose of moving the piston 12 and piston rod 11 toward the right and the port 14 is designed to admit fluid pressure to the right-hand end of cylinder 10 for the purpose of moving the piston 12 from right to left. When the piston is moved from left to right by pressure admitted through port 13 fluid in the cylinder may be released through port 14 and conversely, when fluid pressure is being admitted to the cylinder through port 14 fluid in the cylinder may be released through port 13.

The ports 13 and 14 preferably communicate with annular grooves 15 and 16, respectively, on the interior of the cylinder. The cylinder and piston rod may be equipped with knuckles or the equivalent indicated at 17 and 18 that may be connected to parts of any structure that are to be moved relatively to each other by the ram.

The piston 12 shown as equipped with a suitable seal 19 has at each end thereof a cylindrical extension, these extensions being shown at 20 and 21. Both extensions have internal annular tapered shoulders or beads 22 and 23 that are engageable by the heads 24 and 25, respectively, of spring latching fingers 26 and 27. The arms of the spring fingers are spaced from each other and are preferably integral with threaded bushings 28 and 29 that are anchored in the ends of the cylinder 10. As the piston 12 is moved from left to right by fluid pressure admitted through port 13, the internal shoulder 23 will engage the heads 25 of the spring fingers 27 and cam these fingers inwardly as illustrated on FIG. 2. On reaching the extreme end of its stroke the heads 25 pass beneath the internal shoulder 23 and by reason of their inherent resiliency snap outwardly so that the heads 25 engage the inner side of the shoulder 23, thus holding or latching the piston in its extreme position in the right-hand end of the cylinder. Conversely, if the piston is moved from right to left by the addition of fluid pressure to port 14, the shoulder 22 will engage the heads 24 and cam these latching fingers inwardly until these heads may pass beneath the shoulder and assume the position shown in FIG. 1, latching the piston in its extreme left-hand position.

At each side of the piston 12 there is a locking ring or plate 30 and 31. Each locking plate presents a rebated outer edge, the inner or smaller circumference of which is engageable with the heads 24 and 25, respectively, to hold these heads in locking engagement with the internal shoulders or beads 22 and 23, respectively. Thus, as shown in FIG. 1, when the spring fingers 26 have expanded the heads 24 against the inner face of the internal shoulder 22 the locking ring 30 assumes a position within the heads 24 preventing their contraction and thus forming a mechanical lock against the piston 12 being displaced from this extreme position. The locking plate 30 is urged into this locking position by means of coil compression springs or the equivalent indicated at 32 which are recessed in one face of the piston 12. The other locking plate 31 is urged outwardly or away from the piston by means of corresponding coil compression springs or the equivalent indicated at 33.

The two locking plates 30 and 31 are slidable on bolts 34 which slidably extend through the piston 12 and are sealed such as by O-ring seals or the equivalent indicated at 35. These bolts threadedly extend into a cap 36 that slidably encloses the end of the piston rod 11 and is sealed with relation thereto as indicated by the seal 37.

The piston has ports 38 communicating with the annular groove 15 when the piston is in its extreme left-hand position as viewed in FIG. 1. The end of the piston rod 11 is hollow as indicated at 39 and has a port therein indicated at 40 which communicates with the interior of the cylinder on the right-hand side of the piston as viewed in FIG. 1.

The length of the bolts 34 is such that when the cap 36 is in its extreme right-hand position as viewed in FIG. 2, the heads of the bolt limit outward movement of the locking plate 31 to a position wherein as the piston approaches the end of its stroke toward the right, as viewed in FIG. 2, the spring fingers 27 will have their heads engage the chamfered or camming face of the shoulder or bead 23 and be pressed inwardly thereby to engage the outer face of the locking plate. Conversely, if the heads of the bolts 34 and the locking plate 31 are in their extreme left-hand position with relation to the piston 12 the cap 36 will limit the position of the locking plate 30 to one wherein the spring fingers 26 and their heads 24 will engage the shoulder or bead 22 and be cammed inwardly thereby and caused to engage the face of the locking plate 30 and move it from left to right relatively to the bolts 34 as the piston approaches the end of its stroke toward the left as viewed in FIG. 1.

Preferably, the piston rod 11 is made up of two parts which threadedly telescope relatively to each other as indicated at 41, and these parts are locked in adjusted position such as by a jamb nut 42. By this construction the overall or effective length of the piston rod can be varied or adjusted.

In the preferred form of construction, the end of the cylinder is closed by a threaded closure 43 which screws into the end of the cylinder and is consequently axially adjustable relatively thereto. This closure can be locked in adjusted position such as by a jamb nut 44 or the equivalent. The bushing 29 is threadedly mounted in the closure 43 so as to be rigid therewith and adjustable therewith along the length of the cylinder 10. By reason of the adjustment of the closure 43 with relation to the cylinder the effective length of the stroke of the piston can be varied. 45 merely indicates a gland threadedly mounted in the closure 43 cooperating therewith to prevent leakage around that portion of the piston rod 11 that extends through the closure.

The operation of the above-described construction is substantially as follows:

Assuming the ram to be in the position shown in FIG. 1 wherein the piston is at the extreme left end of its stroke, it will be noted that the heads 24 of the latching fingers 26 are engaged behind the shoulder or bead 22. These fingers are locked against release of the piston by engagement of the heads 24 with the locking plate 30—the locking plate 30 preventing inward contraction or collapse of the spring fingers. In this position, the piston and piston rod are mechanically locked against movement relative to the cylinder 10 regardless of external forces applied to the piston rod and cylinder, tending to move or displace the piston. When it is desired to move the piston 12 from this locked position, fluid pressure is supplied to port 13. This pressure is conducted through groove 15, ports 38, and through the spaces between the latching fingers 26 to the end of the chamber in the cylinder surrounding the cap 36. When this occurs fluid pressure in the cylinder to the right of piston 12 is reduced or released through port 14 so that a differential in pressure exists between the fluid pressure supplied through port 13 that is effective on the left-hand side of piston 12 and the pressure existing on the right-hand side of the piston. This differential in pressure is effective on the area of cap 36 opposite the end of piston rod 11 and on the cross-sectional areas of bolts 34 to move the cap 36 and bolts 34 from the position shown in FIG. 1 toward the right. In so doing, the effort of the springs 32 is overcome. Movement of the cap 36 toward the right moves the locking plate 30 toward the right and thus clears the heads 24 of the latching fingers 26. The pressure being effective on the piston 12 urging the piston toward the right causes the chamfer or camming surface on the shoulder 22 to cam the heads 24 inwardly, this being permitted by the shifted position of the locking plate 30. The latching fingers 26 are thus caused to automatically release the piston for movement from left to right whenever pressure is supplied to port 13 and released through port 14.

When the piston 12 moves from the position shown in FIG. 1 to the position shown in FIG. 2, the shoulder or bead 23 first encounters the heads 25 on the latching fingers 27 camming these fingers inwardly and causing the heads 25 to move inwardly against the outer face of locking plate 31. The locking plate 31 will consequently be forced rearwardly with relation to the piston 12 by the heads 25 against the effort of the coil springs 33 until the heads 25 have passed beneath the shoulder 23 and have sprung outwardly into the position shown in FIG. 3. When this occurs the locking plate 31 is freed or cleared to be acted upon by the springs 33 and moved into the position shown in FIG. 3, locking the latching fingers 27 against inward collapse or contraction. In this position, a mechanical lock is established between the piston and the end of the cylinder 10 for holding the piston in its extreme right-hand position in the cylinder. This mechanical lock is maintained until such time as fluid pressure is supplied to port 14 and released through port 13. When it is desired to move the piston from right to left, as viewed in FIG. 3, fluid pressure is supplied through port 14 and passes therefrom through ports in the closure 43 through the spaces between the fingers 27 to the interior of the cylinder on the right of the piston 12. This pressure is effective on the cross-section areas of the bolts 34, urging the bolts from right to left, and is also conducted through port 40 and the interior 39 of the piston rod 11 to the interior of cap 36, urging the cap 36 and bolts 34 from right to left. The heads of the bolts 34 consequently shift the locking plate 31 from right to left, thus unlocking or clearing the heads 25 of the latching fingers. The admitted pressure is also effective on the piston 12 urging the piston from right to left, and consequently causing the shoulder 23 to cam the heads 25 inwardly until these heads have cleared the shoulder and entirely released the piston. When the piston approaches the end of its right to left stroke, the shoulder 22 engages the head 24 of the latching fingers 26 camming these heads inwardly and causing them to engage the locking plate 30 pressing the locking plate 30 rearwardly against the effort of the springs 32 until the heads 24 have passed beneath the shoulder 22 and have expanded into latching position in engagement with shoulder 22. When this occurs the springs 32 become effective to move the locking plate 30 from right to left and thus lock the latching fingers 26 against contraction or inward collapse. A mechanical lock is thus established between the piston and cylinder in this position as depicted in FIG. 1.

In the alternative construction illustrated in FIG. 6, the construction is substantially the same as that previously described with the exception that the piston rod 11a is solid and is not equipped with a hollow interior 39 or a port 40. Also, the cap 36 is omitted and is replaced by nuts 46. In this form of construction the operation is substantially the same as that previously described with the exception that when the piston is locked in its extreme left-hand position as shown in FIG. 6, the pressure admitted through port 13a, instead of being effective on the exterior of a cap 36 in addition to the cross-sectional area of the bolts 34, is merely effective on the cross-sectional areas of the bolts 34a. Although the sum of the cross-sectional areas of the bolts 34a is less than the effective area of the cap 36 when subjected to pressure on the left-hand side of the piston these areas are adequate to cause the bolts 34a to effect an unlocking of the latching fingers 26a by the locking plate 30a brought about by moving the locking plate 30a from left to right from the position shown in FIG. 6. Conversely, when the piston is in its extreme position at the other end of the cylinder, pressure effective on the cross-sectional areas of the bolts 34a is sufficient to cause the locking plate 31a to move from right to left and thus release the latching fingers 27a.

In FIGS. 7 and 8 another form of construction embodying the present invention is disclosed wherein the cylinder 50 has a piston rod 51 reciprocable therein in response to fluid pressures that are admitted to opposite ends of the cylinder through inlets 52 and 53, respectively. Adjacent each end of the cylinder there are anchored sets of headed latching fingers, one set being indicated at 54 and the other set at 55. These latching fingers are engageable over rigid external shoulders 56 and 57 that are rigidly mounted on the piston rod 51.

A piston generally indicated at 58 has a limited sliding movement on the piston rod 51 between the two shoulders 56 and 57. This piston is preferably formed of three parts, the central part 59, equipped with inner and outer seals which seal against the piston rod and cylinder, respectively. The end parts 60 and 61 provide external flanges which limit axial movement of locking rings 62 and 63. These locking rings are urged outwardly by coil compression springs 64 and 65 and when in their outermost positions are capable of passing over the heads of the latching fingers 54 and 55, respectively.

In this form of construction, when fluid pressure is admitted to the inlet 53 it is effective on the piston to move the piston from right to left until the piston engages the shoulder 56 forcing the piston rod 51 from right to left. As the piston approaches the end of its stroke the shoulder 56 engages the heads of the latching fingers 54 spreading the latching fingers outwardly until the heads of the latching fingers have passed over the shoulder. The springs of the latching fingers are effective to move the heads thereof inwardly over the shoulder 56 and when they assume a locking position against the shoulder 56 locking ring 62 is shifted by its spring 64 into a position between the heads of the latching fingers 54 and the interior of the shoulder 50, thus mechanically locking the piston rod 51 at the end of its stroke.

When fluid pressure is admitted to the inlet 52 this fluid pressure is effective on the effective area of the piston between the piston rod 51 and cylinder 50 to bodily shift the piston from its position against shoulder 56 to a position against shoulder 57. This limited movement of the piston 58 relative to the piston rod 51 is effective to withdraw the locking ring 62 from its position between the heads of the latching fingers and the interior of the cylinder 50, thus freeing the latching fingers 54 so that they may expand outwardly in passing over the shoulder 56. When the latching fingers are thus unlocked from behind the shoulder 56 the piston rod 51 can then be forced by the piston that is subjected to fluid pressure from inlet 52 to move from left to right. During the movement from left to right fluid in the cylinder 50 is expelled through inlet 53. When the piston rod 51 approaches the end of its stroke from left to right shoulder 57 cams the heads of the latching fingers 55 outwardly until these heads pass over the shoulder 57. When the heads of the latching fingers 55 have passed over the shoulder 57 the springs of the latching fingers cause the heads to move inwardly behind the shoulder and thus clear the locking ring 63 which is then urged axially by the compression spring 65 to occupy its position between the heads of the latching fingers and the interior of the cylinder 50, thus mechanically locking the piston rod 51 at the right-hand end of its stroke. The piston rod thus remains mechanically locked in this position until fluid pressure is again admitted to inlet 53 which is first effective to move the piston 58 from the position against shoulder 57 to its position against shoulder 56 as illustrated in FIG. 7.

When the latching fingers 55 are thus released or unlocked the pressure is effective to move the piston rod from right to left, and in so doing, shoulder 57 merely cams its way between the heads of the latching fingers 55. This construction facilitates the application of an indicator which will positively indicate whether the piston rod 51 is at one extreme end of its stroke and has been mechanically locked in that position.

As illustrated on FIGS. 7 and 8, rockershafts 66 and 67 may be rotatably mounted in journals 68 and 69 on sides of the cylinder 50. These rockershafts have arms 70 and 71 which extend through openings in the wall of the cylinder and are arranged in the path of the locking rings 62 and 63. The rockershafts are biased by torsion springs 72 into positions engageable by the locking rings when the locking rings 62 and 63 are in positions locking the heads of the latching fingers against expansion. The rockershafts also carry arms 73 and 74 engageable with electric switches 75 that are in circuit with indicators represented by electric lamps 76 and 77.

It will be appreciated that when piston rod 51 is at the extreme end of its left-hand stroke as shown in FIG. 7, and the locking ring 62 has been allowed to enter between the heads of the latching fingers 54 and the interior of the cylinder 50 locking ring 62 can then engage arm 70 and rotate rockershaft 66, causing arm 73 to engage its switch 75 and close the circuit through indicator 76, thus indicating that the piston rod 51 is at the extreme left end of its stroke and has been mechanically locked in that position. If, for any reason, the piston has not reached the extreme left end of its stroke and has not become mechanically locked in that position locking ring 62 will not have entered between the heads of the latching fingers and the interior of the cylinder 50 and will consequently have failed to actuate the rockershaft 66. It is only when locking ring 62 occupies a locking position with respect to the latching fingers 54 that the indicator 76 is energized. Likewise, it is only when locking ring 63 is in locking position with relation to the latching fingers 55 that indicator 77 is energized.

From the above-described constructions it will be appreciated that a novel and advantageous ram has been provided wherein the piston on the ram may be automatically and mechanically locked at either or both of its extreme positions within the cylinder. Consequently, if the piston has been moved to either of these extreme positions and the source of fluid pressure supplied to the cylinder should fail the piston will remain locked mechanically in its extreme position. The piston will also remain locked in its extreme position if the fluid pressure supplied to the cylinder should be reduced for any reason whatsoever. Although the piston is mechanically locked in the ends of its stroke the piston is automatically unlocked or released whenever fluid pressure is supplied to that end of the cylinder which will urge the piston toward the opposite end.

It will be appreciated by those skilled in the art that the present construction is of relatively simple and highly durable design having relatively few moving parts. Furthermore, the design is such that if the piston and piston rod are rotated relatively to the cylinder for any reason, such relative rotation in no way interferes with or affects the locking mechanism or in any way modifies the manner in which the locking mechanism is caused to release the piston.

In the usual situation when it is desired to mechanically lock a piston against movement relative to its cylinder it is desirable to lock the piston at both ends of its stroke. However, this is not essential and the locking means at either end may be employed alone and without the other. Furthermore, it will be appreciated that although the shoulders 22 and 23 are shown as being internal shoulders on the piston and the locking plate shown as preventing inward collapse or contraction of the latching fingers, this arrangement could be reversed. That is, shoulder 22 and 23 could be external shoulders formed on the piston rod and engaged by the latching fingers arranged externally thereof. In such an arrangement, the locking plates 30 and 31 would be arranged externally of the latching fingers and would lock them against expansion until such time as fluid pressure were admitted to the cylinder intended to move the piston from one end of its stroke to the other.

Various changes may be made in the details of construction without departing from the spirit and scope of the invention as defined by the appended claims.

I claim:

1. A cylinder having a piston reciprocable axially therein; means for admitting fluid pressure to an end of the cylinder to move said piston axially in said cylinder, said piston having an annular end portion projecting axially therefrom toward said end of the cylinder, said annular portion being formed adjacent the outer end thereof with an inwardly extending shoulder; latching fingers anchored with the cylinder and having outwardly projecting means thereon engageable with said shoulder when the said piston is positioned in said end of the cylinder, releasably to hold the piston against longitudinal movement relative to the cylinder when said means is locked in such engagement; an annular locking plate mounted coaxially adjacent an exterior coaxial end portion of the piston for longitudinal reciprocatory movement thereon and engageable in a first longitudinal position thereon internally with said fingers to lock said means outwardly in such locking engagement with said shoulder; resilient means in said piston urging said locking plate into such first longitudinal position; and means on said piston, responsive to the fluid pressure in the said end of said cylinder for moving said locking plate against the force of said resilient spring means into a second longitudinal position unlocking said means from said engagement with said shoulder, thus permitting said means to disengage said shoulder and the piston to be moved by said fluid pressure.

2. A cylinder having a piston reciprocable axially therein; means for admitting fluid pressure to an end of the cylinder to move said piston axially in said cylinder, said piston having an exterior annular end portion projecting axially therefrom toward said end of the cylinder, said annular portion being formed adjacent the outer end thereof with an inwardly extending shoulder; latching fingers anchored within the cylinder and having outwardly projecting means thereon engageable with said shoulder when the said piston is positioned in said end of the cylinder, releasably to hold the piston against longitudinal movement relative to the cylinder when said means is locked in such engagement; an annular locking plate mounted coaxially adjacent an exterior coaxial end portion of the piston for longitudinal reciprocatory movement thereon and engageable in a first longitudinal position thereon with said fingers to lock said means in such locking engagement with said shoulder; resilient means in said piston urging said locking plate into such first longitudinal position; and means on said piston and responsive to the fluid pressure in the said end of said cylinder for moving said locking plate against the force of said resilient means into a second longitudinal position unlocking said means from said engagement with said shoulder, thus permitting said means to disengage said shoulder and the piston to be moved by the said fluid pressure.

3. A cylinder having a piston reciprocable axially therein; means for admitting fluid pressure to an end of the cylinder to move said piston axially in said cylinder, said piston having an annular end portion projecting axially therefrom toward said end of the cylinder, said annular portion being formed adjacent the outer end thereof with a laterally extending shoulder; latching fingers anchored within the cylinder and having means thereon engageable with said shoulder when the said piston is positioned in said end of the cylinder, releasably to hold the piston against longitudinal movement relative to the cylinder when said means is locked in such engagement; an annular locking plate mounted coaxially on an end portion of the piston for longitudinal reciprocatory movement thereon and engageable in a first longitudinal position thereon with said fingers to lock said means in such locking engagement with said shoulder; resilient means urging said locking plate into such first longitudinal position; and means on said piston and responsive to the fluid pressure in the said end of the cylinder for moving said locking plate against the force of said resilient means into a second longitudinal position unlocking said means from said engagement with said shoulder, thus permitting said means to disengage the shoulder and the piston to be moved by the said fluid pressure.

4. A cylinder having a piston reciprocable axially therein; means for admitting fluid pressure to an end of the cylinder to move said piston axially in said cylinder, said piston having an annular end portion projecting axially therefrom toward said end of the cylinder, said annular portion being formed adjacent the outer end thereof with a laterally extending shoulder; latching fingers anchored within the cylinder and having means thereon engageable with said shoulder when the said piston is positioned in said end of the cylinder, releasably to hold the piston against longitudinal movement relative to the cylinder when said means is locked in such engagement; an annular locking plate mounted coaxially on said end portion of the piston for longitudinal reciprocatory movement thereon and engageable in a first longitudinal position thereon with said fingers to lock said means in such locking engagement with said shoulder; resilient means urging said locking plate into such first longitudinal position; a plurality of plungers extending axially slidably through said piston and responsive to the fluid pressure differential between said end and the opposite end of said cylinder across said piston, said plungers being coupled to said locking plate for moving said locking plate against the force of said resilient means into a second longitudinal position unlocking said means from said engagement with said shoulder, thus permitting said means to disengage said shoulder and the piston to be moved by the said fluid pressure.

5. A cylinder having a piston reciprocable axially therein; means for admitting fluid pressure to an end of the cylinder to move said piston axially in said cylinder, said piston having an exterior shoulder adjacent an end thereof; latching fingers anchored within the cylinder adjacent said end thereof and having thereon means releasably engageable with said shoulder; locking means carried on the exterior end portion of the said piston for longitudinal reciprocatory movement relative thereto and engageable in a first longitudinal position thereon with the fingers to lock said means in such engagement with said shoulder when said piston is positioned in said end of said cylinder, thereby releasably holding the piston against movement relative to the cylinder; resilient means urging the locking plate into such first longitudinal position; and means carried by said piston and responsive to fluid pressure in said end of said cylinder for moving the locking plate against the action of said resilient means into a second longitudinal position to unlock said means from engagement with said shoulder, thus permitting said means to disengage said shoulder and the piston to be moved by said fluid pressure.

6. A cylinder having a piston reciprocable axially therein; means for admitting fluid pressure to each end of the cylinder and releasing it from the other end to move said piston axially in said cylinder, said piston having an exterior shoulder adjacent each end thereof; latching fingers anchored in the cylinder adjacent each end thereof engageable with one of said shoulders as the piston approaches an end of the cylinder; locking means actuatable upon arrival of said piston at such end of the cylinder for holding the fingers in locking engagement with the shoulder to lock the piston against movement in the cylinder; and means responsive to the admission of fluid pressure to either end of the cylinder to urge the piston toward the opposite end for causing the locking means to unlock the fingers from such engagement with said shoulder and thus free the fingers to release the shoulder and allow the piston to move toward said opposite end of said cylinder in response to said fluid pressure.

7. In combination: a cylinder; a piston and piston rod reciprocable therein, means for admitting fluid pressure to the cylinder to move the piston and piston rod axially in said cylinder; latching fingers anchored in the cylinder adjacent an end thereof engageable with the piston rod to hold the piston rod against movement in the cylinder; locking means carried on said piston for holding the latching fingers in engagement with the piston rod; means responsive to fluid pressure admitted to the said end of the cylinder for moving the locking means into a position effective to release said latching fingers from engagement with said piston rod, thereby to release the piston and piston rod for movement by said fluid pressure.

8. In combination: a cylinder; a piston and piston rod reciprocable in said cylinder, said piston being mounted on said piston rod with freedom for limited axial sliding movement relative thereto; means for admitting fluid pressure to the cylinder to move the piston and piston rod axially in said cylinder; latching fingers anchored in the cylinder engageable with the piston rod to hold the piston rod against movement in the cylinder; locking means carried on said piston for holding the latching fingers in such engagement with the piston rod; means responsive to said axial sliding movement of said piston relative to said piston rod upon admission of fluid pressure to the said end of the cylinder for moving the locking means into a position effective to release the said latching fingers from such engagement with the piston rod, thereby to release the piston and piston rod for movement by said fluid pressure.

9. A cylinder having a piston reciprocable axially in said cylinder; means for admitting fluid pressure to each end of the cylinder and releasing it from the other end thereof, said piston having an exterior shoulder adjacent each end thereof; latching fingers anchored within the cylinder adjacent each end thereof and engageable with said shoulders respectively; locking rings slidably mounted on the exterior of said piston for longitudinal reciprocatory movement relative thereto and engageable with the latching fingers to lock them in engagement with their respective shoulders; spring means urging said locking rings into positions engageable with said latching fingers, said locking rings being retractable against the action of said spring means upon admission of fluid pressure to an end of the cylinder whereby the locking ring in that end of the cylinder unlocks the latching fingers and allows the latching fingers to release their respective shoulders and free the piston for movement in response to said fluid pressure.

References Cited in the file of this patent

UNITED STATES PATENTS

| 2,702,024 | Harold | Feb. 15, 1955 |
| 2,841,123 | Conway | July 1, 1958 |
| 2,851,995 | Westcott | Sept. 16, 1958 |
| 2,887,091 | Martin et al. | May 19, 1959 |

FOREIGN PATENTS

| 581,833 | Great Britain | Oct. 25, 1946 |
| 671,570 | Great Britain | May 7, 1952 |
| 958,771 | France | Sept. 19, 1949 |

UNITED STATES PATENT OFFICE
CERTIFICATE OF CORRECTION

Patent No. 3,003,473                      October 10, 1961

Raymond H. Ottoson

It is hereby certified that error appears in the above numbered patent requiring correction and that the said Letters Patent should read as corrected below.

Column 7, line 35, for "with" read -- within --; column 8, line 48, after "position;" insert -- and --; lines 72 and 75, for "plate", each occurrence, read -- means --; column 9, line 32, after "rod;" insert -- and --; line 42, after "pressure to" insert -- an end of --; column 10, line 4, after "rod;" insert -- and --; line 22, after "shoulders;" insert -- and --.

Signed and sealed this 31st day of July 1962.

(SEAL)
Attest:

ERNEST W. SWIDER
Attesting Officer

DAVID L. LADD
Commissioner of Patents